United States Patent
You et al.

(10) Patent No.: US 6,851,100 B1
(45) Date of Patent: Feb. 1, 2005

(54) MANAGEMENT SYSTEM FOR AUTOMATED WIRE BONDING PROCESS

(75) Inventors: Yean-Sang You, Chungcheongnam-Do (KR); Heui-Seog Kim, Chungcheongnam-Do (KR); Soo-Tae Chae, Chungcheongnam-Do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 122 days.

(21) Appl. No.: 10/387,354

(22) Filed: Mar. 11, 2003

(30) Foreign Application Priority Data

Mar. 11, 2002 (KR) .................................. 10-2002-0012895

(51) Int. Cl.[7] .............................................. G06F 17/50
(52) U.S. Cl. ................................ 716/11; 716/8; 716/9; 716/10
(58) Field of Search .......................... 716/8–15; 700/97, 700/121; 361/783

(56) References Cited

U.S. PATENT DOCUMENTS

| | | | | |
|---|---|---|---|---|
| 4,864,514 A | * | 9/1989 | Yamanaka et al. | ............. 716/19 |
| 5,465,217 A | * | 11/1995 | Yip et al. | ...................... 716/21 |
| 5,498,767 A | * | 3/1996 | Huddleston et al. | .......... 716/12 |
| 5,608,638 A | * | 3/1997 | Tain et al. | ................... 700/121 |
| 6,032,356 A | * | 3/2000 | Eldridge et al. | ............... 29/843 |
| 6,072,700 A | * | 6/2000 | Nam | ........................... 361/783 |
| 6,256,549 B1 | | 7/2001 | Romero et al. | |
| 6,357,036 B1 | * | 3/2002 | Eka et al. | ...................... 716/15 |
| 6,714,828 B2 | * | 3/2004 | Eldridge et al. | ............... 700/97 |

FOREIGN PATENT DOCUMENTS

KR        1020000014112        3/2000

OTHER PUBLICATIONS

English Translation of Korean Abstract for Publication No. 1020000014112 Filed Mar. 06, 2000.

* cited by examiner

Primary Examiner—Vuthe Siek
Assistant Examiner—Naum Levin
(74) Attorney, Agent, or Firm—Marger Johnson & McCollom, P.C.

(57) ABSTRACT

An integrated management system is provided for automatically executing a procedure of reviewing and editing an assembly reference and a bonding specification used for manufacturing IC packages. The system includes a drawing management system (DMS) that creates the assembly reference, and a bonding specification drawing system that creates, based on the assembly reference, the bonding specification. The integrated management system further includes a DMS database server that stores and manages the assembly reference and the bonding specification, a DMS file server that manages a blank diagram, a package outline, a bonding diagram, and a standard file, and a DMS web server that provides a web interface to a user for permitting a remote access. In particular, the drawing management system has a bonding rule check module that verifies whether the bonding specification meets a bonding rule suitable for an automated wire bonding process. The drawing management system produces the standard file to be transmitted to bonding equipments.

31 Claims, 13 Drawing Sheets

MANAGEMENT SYSTEM FOR AUTOMATED WIRE BONDING PROCESS

This application claims priority to Korean Patent Application No. 2002-12895, filed on Mar. 11, 2002, the contents of which are hereby incorporated by reference in their entirety.

BACKGROUND OF THE INVENTION

1. Field of the Invention

The present invention relates to semiconductor integrated circuit (IC) assembly technology, and more particularly, to a system for integrally managing data required for an automated wire bonding process.

2. Description of the Related Art

The assembly technology used for packaging and interconnecting electronic components is becoming a highly important field that affects the efficiency of computers or other kinds of electronic systems. A semiconductor chip package assists a semiconductor IC chip to be settled in the electronic system, and provides proper surroundings to guarantee good reliability and suitable operation of the IC chip. The package also electrically connects the IC chip with the electronic system.

With conventional plastic packages, a detailed description of the package assembly process is given below. The package assembly process begins with a wafer in which a great number of circuitries are already formed through the wafer fabrication process. The wafer is subjected to an electric die sorting (EDS) test. Depending on the result of the EDS test, failed dies (i.e., poor IC chips) in the wafer are marked with ink. The wafer is then sawed and divided into individual IC chips. A passed die (i.e., good IC chip) is bonded to one portion of a package base, for example, a die pad of a lead frame. This die bonding process typically; includes a step of coating adhesive material such as silver-poxy onto the package base, a step of placing the IC chip on the package base and a step of curing adhesive material. Thereafter, wires electrically connect the IC chip with another portion of the package base, for example, leads of the lead frame. Tape automated bonding or flip chip bonding can be alternatively used for such electrical connection. The IC chip and the package base are encapsulated in a plastic body by molding. Outer ends of the leads are bent into a suitable form, and a product number, etc. is marked on the plastic body. The finished package is then subjected to tests in reliability and electrical properties.

In the package assembly process, the wire bonding technology is most widely used for electrical interconnection between the IC chip and the lead frame. The wire bonding process should attain high throughput and economical production yield. For this reason, a high-speed wire bonder having a handling system and an image sensing system is generally employed. The handling system supplies the lead frame to a worktable, and the image sensing system permits the IC chip to coincide with a bonding diagram. An automatic thermosonic bonding is a high yield interconnection process that uses heat and ultrasonic energy to form a metallurgical bond. Typically, a gold wire is used and a ball bond is formed at one end and a stitch bond at the other. A ball is formed on the tail of the wire which extends from the end of a capillary. A hydrogen flame or an electronic spark may be used to form the ball. The capillary descends and presses down the ball onto an electrode pad of the IC chip while ultrasonic vibration is applied. After the ball is bonded to the IC chip, the wire forms a loop by sequential actions of the capillary. Then, the capillary deforms the wire against the lead of the lead frame, producing a wedge-shaped bond. The cycle is completed and ready for the next ball bond.

As described above, the wire connects the electrode pads and the leads one by one. Therefore, the high-speed wire bonding process requires information on both a chip layout and a lead frame structure. Further, there is a need for integrated management of both chip layout data and lead frame design data.

In order to enhance the production yield of the package assembly process, especially the wire bonding process, a good design rule of the IC chip should be primarily established and observed. The design rule has to accord with a specific type of the package to be manufactured and should be fitted to current assembly equipments. Further, it is desirable that the determination of the design rule is made before chip laying-out. As the size of the IC chip is reduced and the number of input/output pins is increased, an area necessary for electrical connection influences a chip size. In other words, reductions are required in electrode pad size, pad pitch, process tolerance, etc. Moreover, the chip layout directly influences automation and reliability of the assembly process. It is therefore preferable to incorporate the design rule into a chip layout CAD (computer aided design) system. For example, a wire bonding template that indicates ball bond and stitch bond positions based on the design rule is preferably used for the plastic package assembly process. By overlapping the template and the chip layout, a design engineer can determine desirable positions of the electrode pads.

For automation of the assembly process, it is also essential to apply data in each assembly step to subsequent assembly steps without additional modification or processing. A related technique is disclosed in U.S. Pat. No. 6,256,549 issued to Cirrus Logic, Inc. Herein, a computerized database includes a table representing a list of part numbers. The database provides computerized links between individual part numbers and associated manufacturing process data for different process steps or that part number. Rather than correlate data by hand, a user may click on a process step for a particular part number to instantly and accurately retrieve that data. Manufacturing process data may include wafer back-lapping process data, wire bonding data, testing parameters, packaging data, and marking data.

Another technique related to assembly automation is disclosed in U.S. Pat. No. 5,608,638 issued to Advanced Micro Devices. Herein, a system and method including a user interface for automation of a build sheet is provided. The database icon or command of the user interface is executed to select an appropriate package for an IC chip, and a blank bond master is downloaded to the hard disk of the workstation. The engineer can choose either the suggest die icon/command or the die cleaner icon/command to create an image file of the die pad ring based on a mask layer best representative of the die pad ring. Thereafter, the die pads and bond fingers are, identified and a net list is complied when the wire bonding icon or command is executed to create a bonding device diagram without the die image. A die image is created based on a mask layer best representative of the die using either the TIF to AutoCAD icon/command or the GDS to AutoCAD icon/command. The Die Image Merge icon/command merges the die image with the bonding device diagram to complete the build sheet. Thereafter, an IC package may be fabricated based on the bonding device diagram.

Though such conventional automation techniques may be helpful to an engineer who makes a bonding diagram for the automated wire bonding process, a design or product engineer engaged in mass production line for packaging numerous kinds of IC chips still needs much more improved automation technique. Additionally, a chip layout designer and a lead frame designer seldom benefit by conventional automation techniques. Further, if there is no particular platform, e.g., UNIX workstations, adapted for conventional techniques, an engineer or a designer has difficulty in using the automation techniques. Further, additional manual work is needed to utilize design data or assembly data, created by a CAD drawing tool operating at existing workstation platforms, as Assembly Reference or Bonding Specification at actual mass-production lines. Unfortunately, this requires excessive manual labor and time consumption, and may cause unexpected human error.

SUMMARY OF THE INVENTION

In a preferred embodiment, an integrated management system is provided for automatically executing a procedure of reviewing and editing an assembly reference and a bonding specification used for manufacturing IC packages. The system comprises a drawing management system (DMS) that creates the assembly reference, and a bonding specification drawing system (eSPEC) that creates, based on the assembly reference, the bonding specification. The assembly reference has a bonding diagram, a package outline, a package pin configuration and package pin coordinates. The bonding specification has a size of a chip, a size and a position of an electrode pad of the chip, a size and a position of a die pad, a length of a wire, a position and an angle of the wire, a bonding sequence, a datum point of the electrode pad, a datum point of a lead, a central point of the electrode pad, and bonding teach point of the lead.

The integrated management system further comprises a DMS database server that stores and manages the assembly reference and the bonding specification, a DMS file server that manages a blank diagram, the package outline, the bonding diagram, and a standard file, and a DMS web server that provides a web interface to a user for permitting a remote access. In particular, the drawing management system comprises a bonding rule check module that verifies whether the bonding specification meets a bonding rule suitable for an automated wire bonding process. The drawing management system produces the standard file to be transmitted to bonding equipments.

Preferably, the drawing management system may provide an assembly reference review and an assembly reference edit. The drawing management system may also provide a pre-bonding, a batch modification, an administrator menu, an information menu, etc. Additionally, the DMS database server can store bonding rule data. The DMS file server can produce a chip pad file from chip layout data and sends the chip pad file. The chip pad file may include dimensions of the chip, a size of an opening on the electrode pad, arrangement and number of the electrode pads, a pitch between the electrode pads, and a width and a length of a scribe line. The DMS web server can provide a blank diagram database, a package outline database, and a bonder viewer. The bonder viewer may display the bonding diagram retrieved through the DMS filer server according to bonding procedure.

The system of the present invention may further comprise a CAD data processing module, which performs a centering operation. The bonding rule check module has bonding rules based on a pitch between the electrode pads. Preferably, the bonding rules includes rules related to a bonding pad opening (BPO), an electrode pad layout for fine pad pitch, a chip pad design by pad pitch, a bonding wire, and a chip dimension.

The system of the present invention may further comprise a blank diagram building module, which includes a reader, a creating module, and a writer. The system may also comprise a package outline building module, which includes a reader, a creating module, and a writer. Similarly, the CAD data processing module may include a reader, a data processing unit, and a writer. The CAD data processing module can create a standard bonding diagram and send the standard bonding diagram to a bonder viewer module. In addition, the BRC module may include a reader, a BRC unit and a writer. The BRC module can provide automatic wiring operation based on a chip pad file, or gate array processing operation which builds verified chip layout data into a chip pad file to meet a user's request.

DETAILED DESCRIPTION OF THE INVENTION

The present invention will be now described more fully hereinafter with reference to accompanying drawings. This invention may, however, be embodied in many different forms and should not be construed as limited to the embodiment set forth herein; rather, this embodiment is provided so that this disclosure will be thorough and complete, and will filly convey the scope of the invention to those skilled in the art.

Terms

Among terms used in this specification, a 'Specification' means a standard, which should be observed for making and using semiconductor IC products. A 'Reference' designates documents including basic information required for making the semiconductor IC products. For example, a 'Design Specification' (hereinafter, referred to as 'Design Spec') defines operational voltage, current, speed, and timing relations between internal signals or internal and external signals, etc. Further, a 'Bonding Specification' (hereinafter, referred to as 'Bond Spec') includes chip size, electrode pad size and position, die pad size and position, wire length, position and angle, bonding sequence, electrode pad datum point, lead datum point, electrode pad central point, lead bonding teach point, etc. An 'Assembly Reference' (hereinafter, referred to as 'Assy Ref') indicates basic information necessary for assembly of IC products, especially, the automated wire bonding process, and includes bonding diagram, pin configuration, package outline, package pin coordinates, bonding rule check result, etc.

Preferred Embodiment

Figure 1:
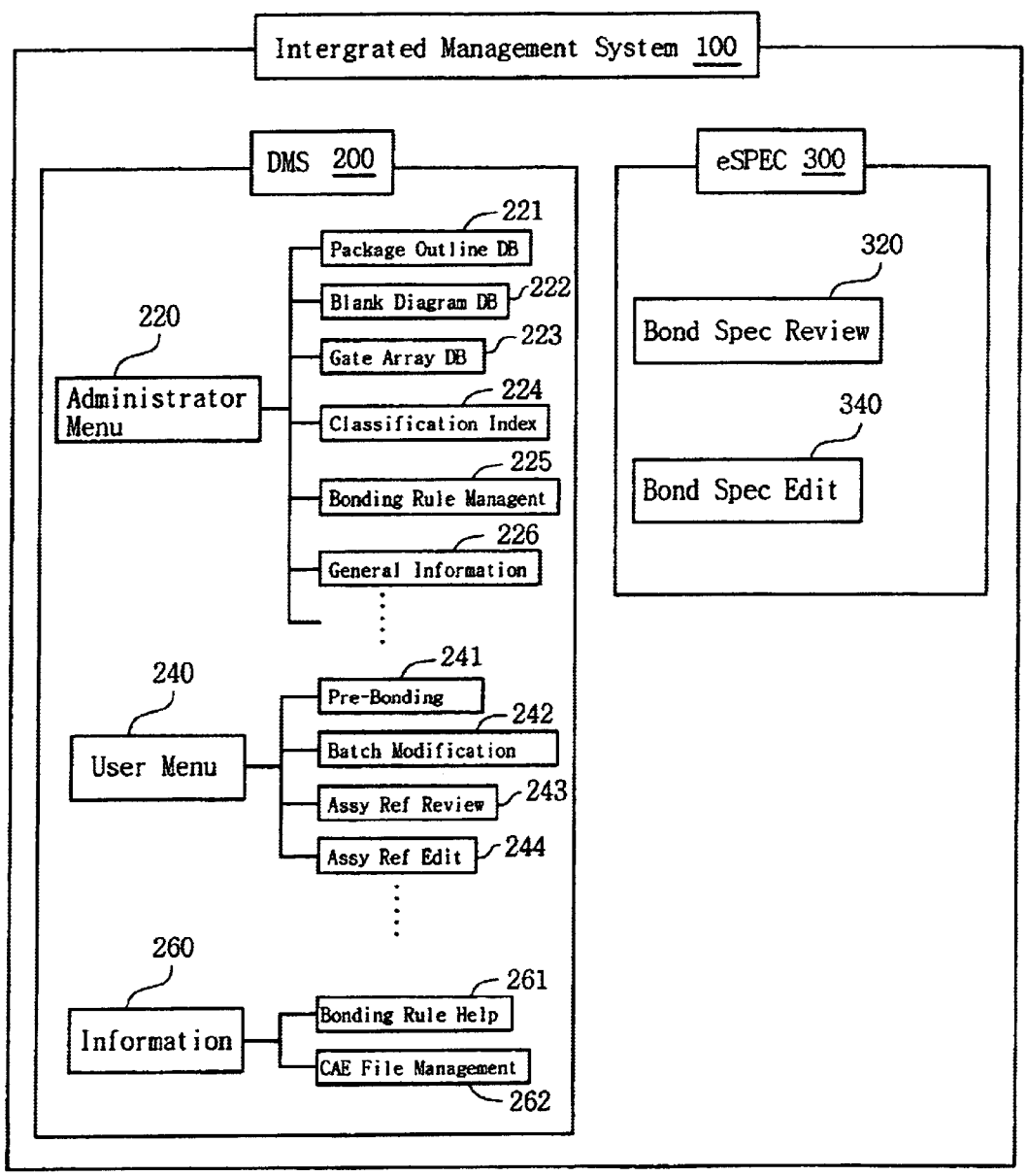
FIG. 1 is a block diagram showing a user interface of an integrated management system in accordance with the present invention.

FIG. 1 is a block diagram showing a user interface of an integrated management system in accordance with the present invention. Referring to FIG. 1, the integrated management system 100 includes a Drawing Management System 200 (hereinafter, referred to as 'DMS') and a Bond Spec Drawing System 300 (hereinafter, referred to as 'eSPEC'). When a user logs on the system 100, a start screen appears to allow access to the DMS 200 and eSPEC 300.

The Assy Ref is based on a Design Spec, which is based on a development standard. The Assy Pef is used for documentation process in DMS 200 and provides basic information for packaging IC products, especially, the wire bonding process.

The DMS 200 includes an administrator menu 220, a user menu 240 and an information menu 260. The administrator menu 220 is for database construction and management. Through this menu 220, a user having authority of administrator creates and manages a package outline DB 221, a blank diagram DB 222, a gate array DB 223, a classification index 224, a bonding rule management 225, and a general information 226. Herein, data stored in the blank diagram DB 222 are not limited to lead frames used for typical plastic packages, rather, include other kinds of package bases such as a printed circuit board (PCB). The package outline DB 221 includes the definition of package pins, a position of the first pin, pin numbering, etc. The blank diagram DB 222 includes a position of a die pad, information on leads, a datum-point of the lead for a wire bonder, and bonding teach points on the leads. The blank diagram DB 222 may be divided into separate databases according to package types. The gate array DB 223 includes design data on the position of the finished die pad. The classification index 224 indicates how to sort various kinds of data stored in the databases.

The user menu 240 includes a pre-bonding 241, a batch modification 242, an Assy; Ref review 243, and an Assy Ref edit 244. The pre-bonding 241 provides a function of simulation for the wire bonding in order to check and correct errors of the bonding diagram designed prior to the completion of the Assy Ref. The pre-bonding 241 may also have an additional function that displays a list according to electrode pad size when a user enters specific chip size and/or package type, and that permits a user to easily select desired pad size. The batch modification 242 provides a function that, when parts of bonding positions are changed in a certain group of products, can modify a set of data equivalent for the change in a single program run. The Assy Ref review 243 provides a function that a user can review or search the Assy Ref already made. And the Assy Ref edit 244 includes functions of drawing and registering new Assy Ref and modifying or deleting the Assy Ref stored in the database. All data corresponding to new, modified or deleted Assy Ref are automatically uploaded to servers of the system.

The function of the administrator menu 220 and the user menu 240 is not limited to the above-described functions. A person skilled in the art will appreciate that other types of functions can be used for implementing the present invention as long as it is within the spirit and scope of the present invention.

Figure 5:
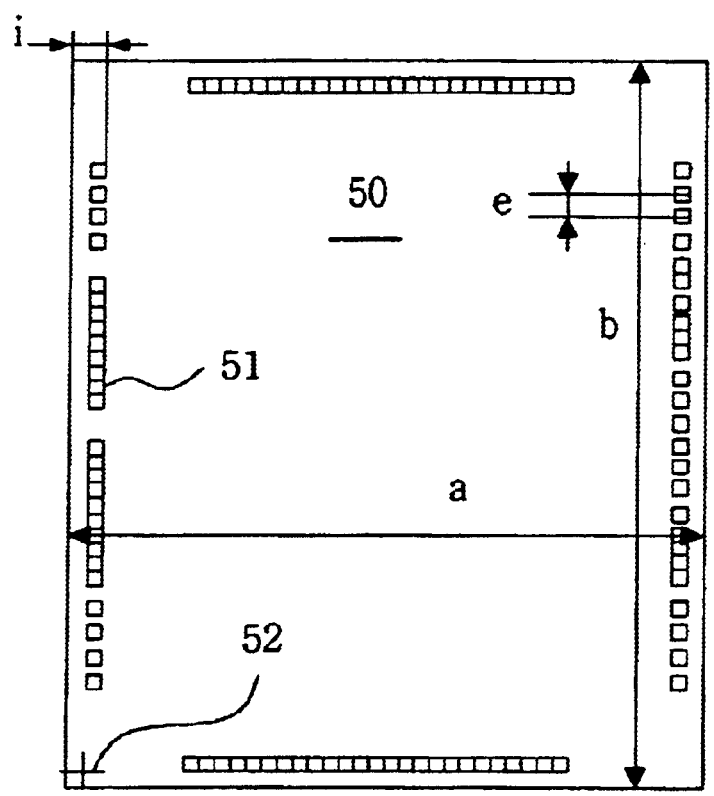
FIG. 5 is a plan view showing exemplary of a chip layout.
Figure 6:
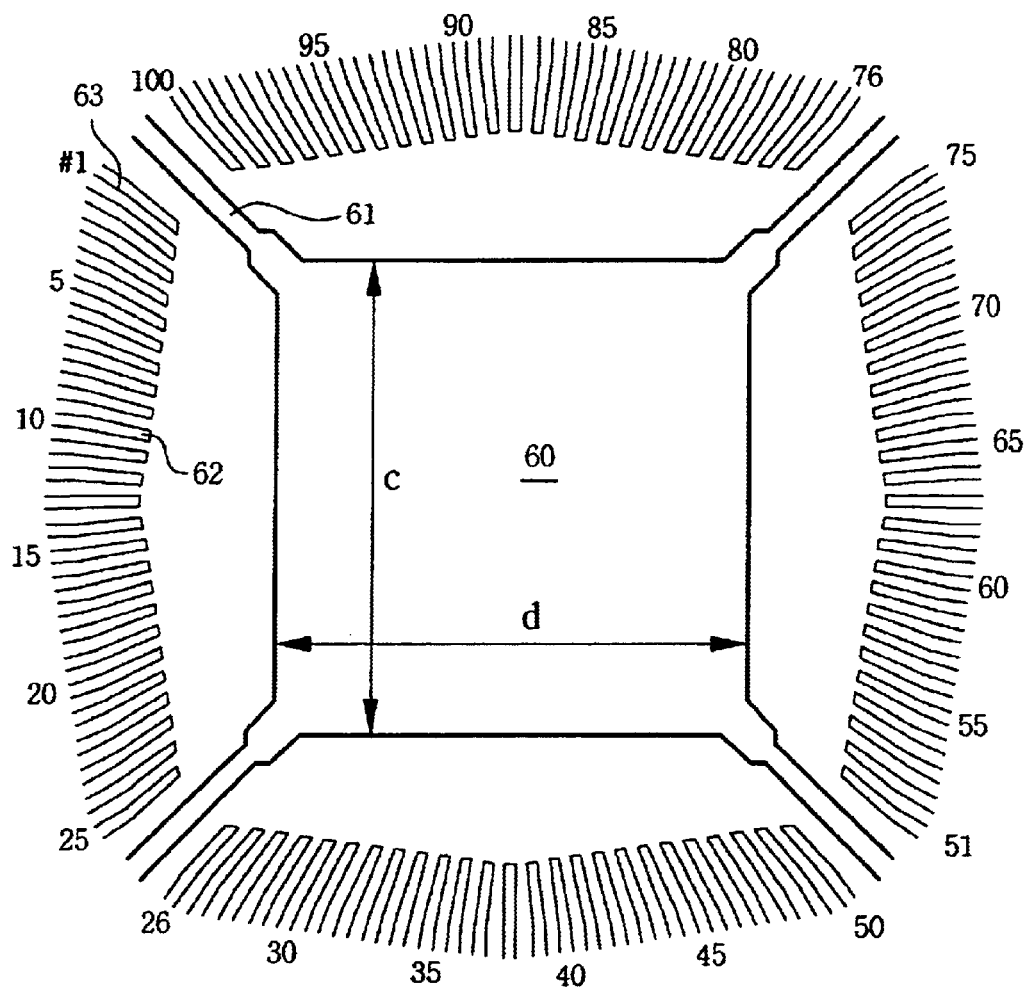
FIG. 6 is a plan view showing exemplary of a lead frame blank diagram.

The information menu 260 of the system 100 is optional and may include a bonding rule help 261 and a CAE (computer aided engineering) file management 262. The bonding rule help 261 provides an explanation for the bonding rule, so that a designer entering the DMS 200 can refer to detailed bonding rules, such as electrode pad size, corner pad pitch, distance between adjacent wires, and wire length and angle, during the design or the Assy Ref review or edit. The CAE file management 262 has a function of managing plenty of data files produced for the assembly process. For example, a chip layout in FIG. 5 and a lead frame blank diagram in FIG. 6 are produced by CAD drawing tools and saved as files with the extension form such as MI, GBR or DXF. Further, bonding diagram files compiled by the system 100 and stored in a database server have the extension form of DXF. In addition, a file server of the system 100 stores blank diagram files in the extension form of bcf, package outline files in the extension form of pkg, and standard files in the extension form of std. The CAE file management 262 also displays files by user logging in, and is a pathway when pad files are transmitted from workstation platform to PC platform.

The eSPEC 300 of the system 100 includes a user interface such as a Bond Spec review 320 and a Bond Spec edit 340. Like the Assy Ref edit 244, the Bond Spec edit has functions of drawing and registering new Bond Spec and modifying or deleting the Bond Spec being registered in the database. As described above, the Bond Spec includes chip size, electrode pad size and position, die pad size and position, wire length, position and angle, bonding sequence, electrode pad datum point, lead datum point, electrode pad central point, lead bonding teach point, etc.

Figure 2:
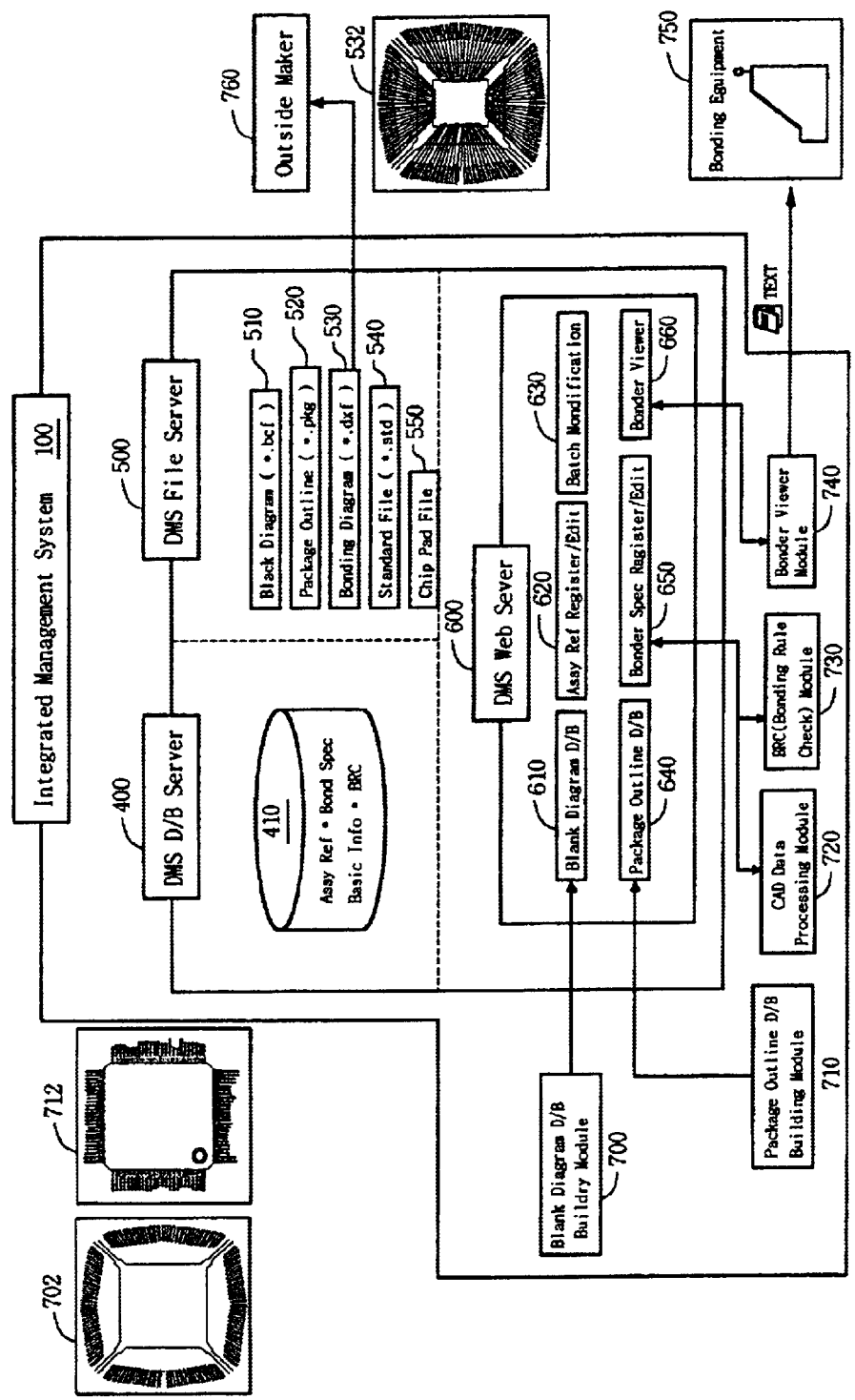
FIG. 2 is a block diagram showing hardware and functional relation of an integrated management system in accordance with the present invention.

FIG. 2 is a block diagram showing hardware and functional relation of an integrated management system in accordance with the present invention. As shown in FIG. 2, the system 100 includes a DMS database server 400, a DMS file server 500 and a DMS web server 600. The system 100 also has a blank diagram database building module 700, a package outline database building module 710, a CAD data processing module 720, a BRC bonding rule check) module 730 and a bonder viewer module 740.

The DMS DB server 400 stores several kinds of data 410 such as Assy Ref data, Bond Spec data, basic information and bonding rule data.

The DMS file server 500 creates a blank diagram 510, a package outline 520, a bonding diagram 530, a standard file 540 and a chip pad file 550, and transmits them. For example, the bonding diagram 530 can be sent to outside makers 760. The chip pad file 550 is produced from chip layout data as exemplarily shown in FIG. 5. Referring to FIG. 5, the chip layout has a semiconductor IC chip 50, a plurality of electrode pads 51 and a chip identification mark 52. The chip layout of FIG. 5 is drawn by using chip design CAD tools, e.g., "OPUS CADENCE" of Cadence Design Systems, Inc. or "Apollo" of Avanti, Corp. Such a chip layout can be made by using a mask layer of chip electrode pad employed during the IC chip fabrication. A chip pad list is retrieved from chip layout data, and the chip pad file 550 is created by using a chip I/O utility (reference number 1200 of FIG. 12). The chip I/O utility is a tool that operates at a workstation platform and that, by using chip layout data and design data, creates the chip pad file 550.

Figure 9A:
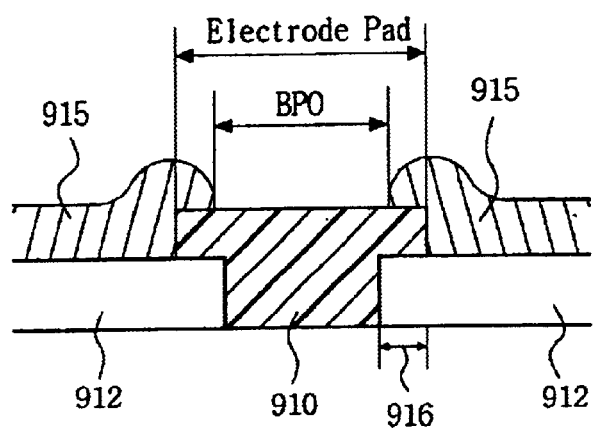
FIGS. 9A and 9B are a sectional view and a plan view for illustrating a design rule related to electrode pads.
Figure 9B:
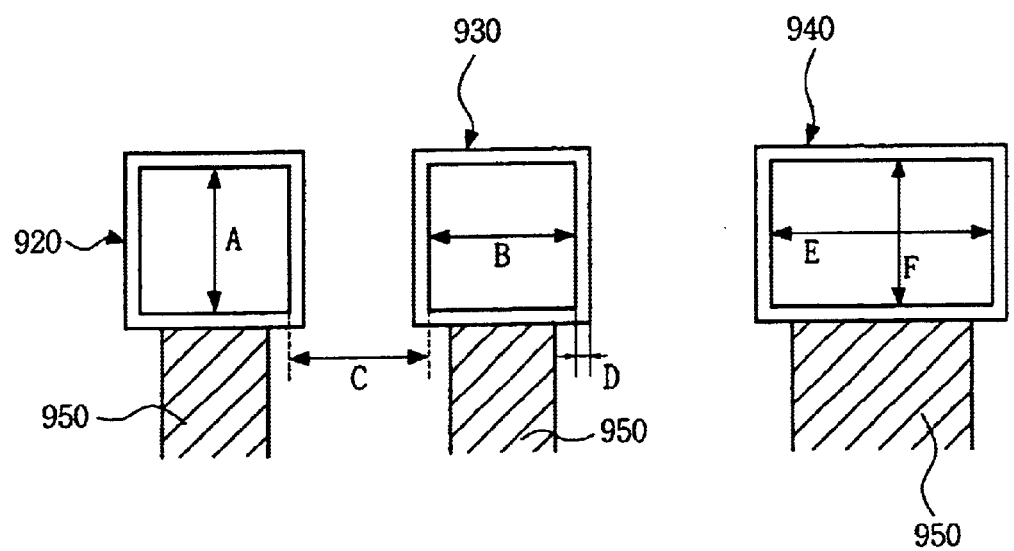

Referring to FIGS. 5, 9A and 9B, the chip pad file includes a large number of data such as the dimensions ('a'×'b' in FIG. 5) of the IC chip 50, the size of an opening ('BPO' in FIG. 9A) on the electrode pad 51, the position of the chip ID mark 52, the arrangement and the number of the electrode pads 51, the position of the first pad, the pitch ('e' in FIG. 5) between the electrode pads 51, and the distance ('i' in FIG. 5) from the electrode pad 51 to the edge of the chip 50. The chip pad file further includes the width and length data of a scribe line (not shown), information about connection between the pad and the lead, the number of BGA balls, the pad function name (i.e., pin name), and physical data on electrode pads.

Returning to FIG. 2, the chip pad file 550 is a CAD file with, e.g., GDS file format, which is converted into a DXF file format by the DMS file server 500. In other words, an automatic conversion is made from a file format available for the workstation platform to a new file format available for the PC platform. The ODS file format and the DXF file format are kinds of standardized graphic CAD data file formats, which are well known in the art. Therefore, a detailed description about the file format will be omitted. In the DMS file server 500, the blank diagram 510, the package outline 520, etc. will be described later.

The DMS web server 600 is linked to a network (not shown) for allowing the access of a remote user, and provides web services based on the World Wide Web. The network linked to the web server 600 may be a computer network of interlinked using TCP/IP, a local area network (LAN) linked by a coaxial cable or optical fiber, or a wide area network (WAN) such as an integrated services digital network (ISDN) and a broadband ISDN (B-ISDN). Preferably, the DMS web server 600 has a security system such as firewall that enforces an access control when a remote user enters. The security system exists to block bad traffic and to permit certified traffic. The web server 600 can provide web services by drawing up Internet documents with hypertext markup language (HTML), and create active real-time web applications and dynamic web pages by using Java technology of Sun Microsystems, Inc. Additionally, the web server 600 can also make web pages more interactive by using Java applets or common gateway interface (CGI).

The DMS web server 600 includes a blank diagram database 610, a web service for an Assy Ref register/edit 620, a web service for batch modification 630, a package outline database 640, a web service for a Bond Spec register/edit 650, and a web service for a bonder viewer 660. The blank diagram DB 610 is linked to the blank diagram DB building module 700, and the package outline DB 640 is linked to the package outline DB building module 710. The Bond Spec register/edit service 650 is connected to both the CAD data processing module 720 and the BRC module 730. The bonder viewer service 660 is connected to the bonder viewer module 740. A bonder viewer file permits the display of the bonding diagram in the database 410 through the filer server 500. In other words, the bonder viewer can provide prearranged bonding procedure in order on screen so that an engineer can check in advance the bonding procedure before actual bonding process. Data produced in the bonder viewer module 740 are transmitted in the form of text to bonding equips equipment 750.

The blank diagram DB building module 700 and the package outline DB building module 710 will be described later. The CAD data processing module 720 converts data drawn by the CAD drawing tools into data suitable for the bonding process. For example, a centering operation is performed in the data processing module 720. In case of memory devices, the trend of today is toward a center pad type in which the electrode pads are disposed at central portions of the active surface. Therefore, the chip layout and the lead frame blank diagram are often in a one-tone ratio. This requires each separate blank diagram depending on a specific chip layout. Accordingly, to speed up CAD drawing operations, only the connection between the lead of the lead frame and the electrode pad of the chip is defined and used during the CAD drawing operations without defining center points of the lead and the pad. The centering operation corrects a resultant CAD drawing file and provides a standard bonding diagram based on corrected data.

BRC (bonding rule check)

The BRC module 730 provides a function of verifying whether the bonding diagram meets the Design Spec. For example, the Design Spec is prepared based on electrode pad pitch of the chip and, regardless of process, classified according to electrode pad types, package types and/or makers. The package types are QFP (quad flat package), PLCC (plastic leaded chip carrier), DIP (dual inline package), TSOP (thin small outline package), BGA (ball grid array), and so on. The bonding rule includes minimum pad pitch, i.e., a minimum one among distances between centers of two adjacent electrode pads. Based on the minimum pad pitch, the bonding rule is determined. Further, the bonding rule may vary by the minimum pad pitch according to assembly process capability. The bonding rule also includes a large number of rules related to a bonding pad opening (BPO in FIG. 9A), an electrode pad layout for fine pad pitch, a chip pad design by pad pitch, a bonding wire, a chip dimension, and so forth.

The rules related to the BPO prescribe the size of the BPO and intervals associated; with the BPO. Referring to FIG. 9A, the BPO defines an exposed upper region of a metal layer 910 for the electrode pad. The metal layer 910 is formed at a particular location on the active surface of the IC chip covered with an insulating layer 912, and connected to internal circuitry (not shown) of the IC chip. During the wafer fabrication process, a passivation layer 915 is coated on both the metal layer 910 and the insulating layer 912 and partly etched to form the BPO. Reference number 916 represents an overlay portion between the metal layer 910 and the insulating layer 912. The rules of the BPO size depend on how many wires reach the BPO for bonding to the electrode pad. In other words, the BPO may receive either a single wire or at least two wires. The former case is indicated by reference numbers 920 and 930, and the latter case is by 940. A minimum size of the BPO affects the size of the wire because a larger ball of the wire may cause damage to the passivation layer 915 around the BPO or shorts between the adjacent wires. The rules of the BPO intervals prescribe a space between the adjacent BPOs, and a distance from the BPO to a scribe line, especially from the outermost BPO to the scribe line.

The rules related to the electrode pad layout for fine pad pitch are applied to smaller pad pitch, for example, 100 μm and less. The fine pad pitch rules prescribe a minimum corner pad pitch, the number of corner pads, a space between minimum corner BPOs, etc. The chip pad design rules by pad pitch prescribe spaces between the electrode pads, peripheral circuitry and the scribe line. The rules regarding the bonding wire define the dimension and angle of the wire. When building the blank diagram DB of the lead frame, a wire dimension database is established according to the package type, the BPO size, and/or the pad pitch. The wire length limits a maximum length from the electrode pads to lead bonding points. The wire angle means an angle between the chip side surface and the bonding wire, generally ranging from 45 degrees to 60 degrees. The rules related to the wires may include a length of the wire passing over the IC chip, i.e., a distance from the center of the electrode pad to the edge of the chip. Too much longer length causes wire sagging that the wire sags and touches at the edge of the chip. The rules for the wires may also include a space between the adjacent wires or between the wire and the lead.

The rules related chip size includes chip pitch, i.e., the size of chip plus the width and length of the scribe line. The chip pitch means a step size in the wafer. The chip size and the scribe line width and length being separately recorded, the chip pad file is created and recorded in the BRC. The rules for chip size may further include a distance from the BPO to the scribe line, a distance from the outermost BPO to the scribe line, a distance from the chip edge to the die pad, and the minimum and maximum of the chip thickness.

Figure 3:
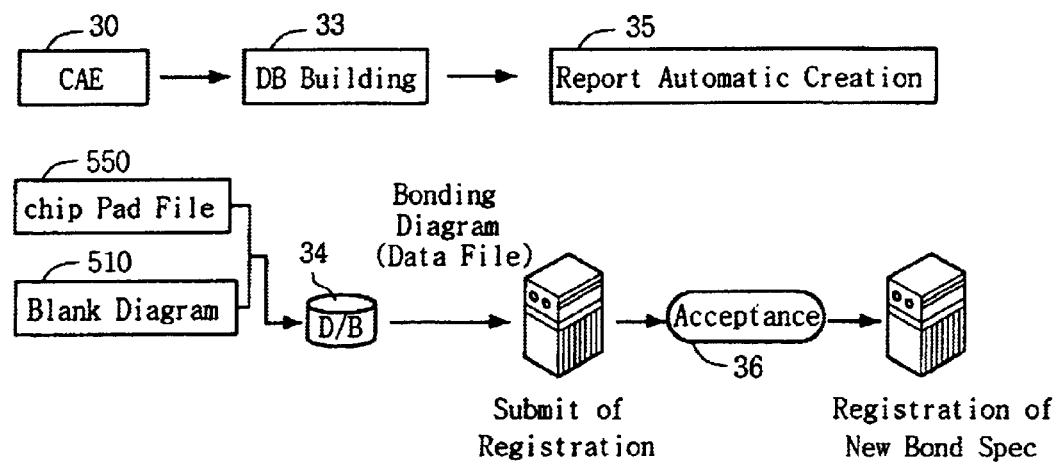
FIG. 3 is a flow diagram showing sequential operations implemented in an integrated management system in accordance with the present invention with regard to ASIC semiconductor devices.

FIG. 3 is a flow diagram showing sequential operations implemented in the system with regard to ASIC semiconductor devices. As shown in FIG. 3, in a CAE step 30, the CAE drawing tool draws chip layout data, from which the chip pad file 550 is created. Further, the lead frame blank diagram 510 is produced from the original drawing of the lead frame. The CAE drawing tool is, for example, a workstation platform based on X-Windows system. Next, in a database building step 33, the Assy Ref or the Bond Spec is created by using the chip pad file 550, the lead frame blank diagram 510, and the BRC module (730 in FIG. 2), and then corresponding databases 34 are built therefrom. In a report automatic creation step 35, the bonding diagram is generated from the databases 34 and submitted for registration of new Bond Spec. After acceptance 36, the new Bond Spec is registered and edited to create the standard file in the bonder viewer module (740 in FIG. 2). The standard file is then transmitted to the bonding equipment (750 in FIG. 2).

Figure 4:
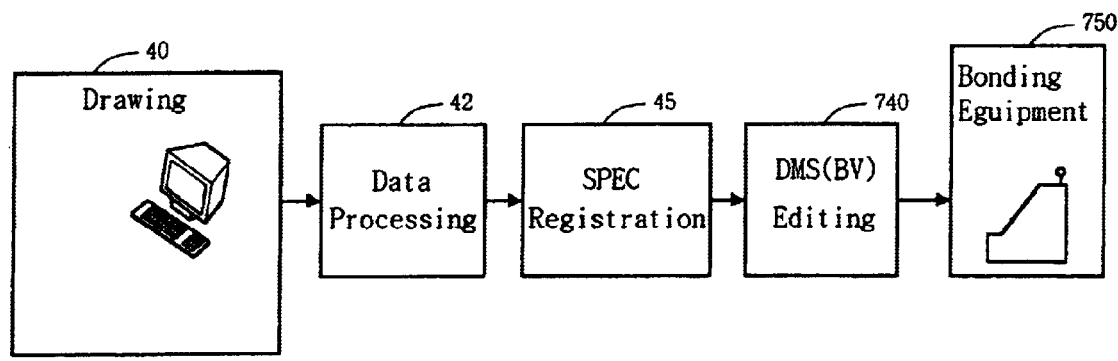
FIG. 4 is a flow diagram showing sequential operations implemented in an integrated management system in accordance with the present invention with regard to memory semiconductor devices.

FIG. 4 is a flow diagram showing sequential operations implemented in the system with regard to memory semiconductor devices. As described above, in case of the memory devices, a bonding diagram drawn in a CAE step 40 should be converted for the bonding process. A date processing or correcting step 42 produces a standard bonding diagram in the CAD data processing module (720 in FIG. 2) by performing, for example, the centering operation. The resultant standard bonding diagram is registered as the Bond Spec (step 45), edited in the DMS bonder viewer module 740, and transmitted to the bonding equipments 750.

Figure 8:
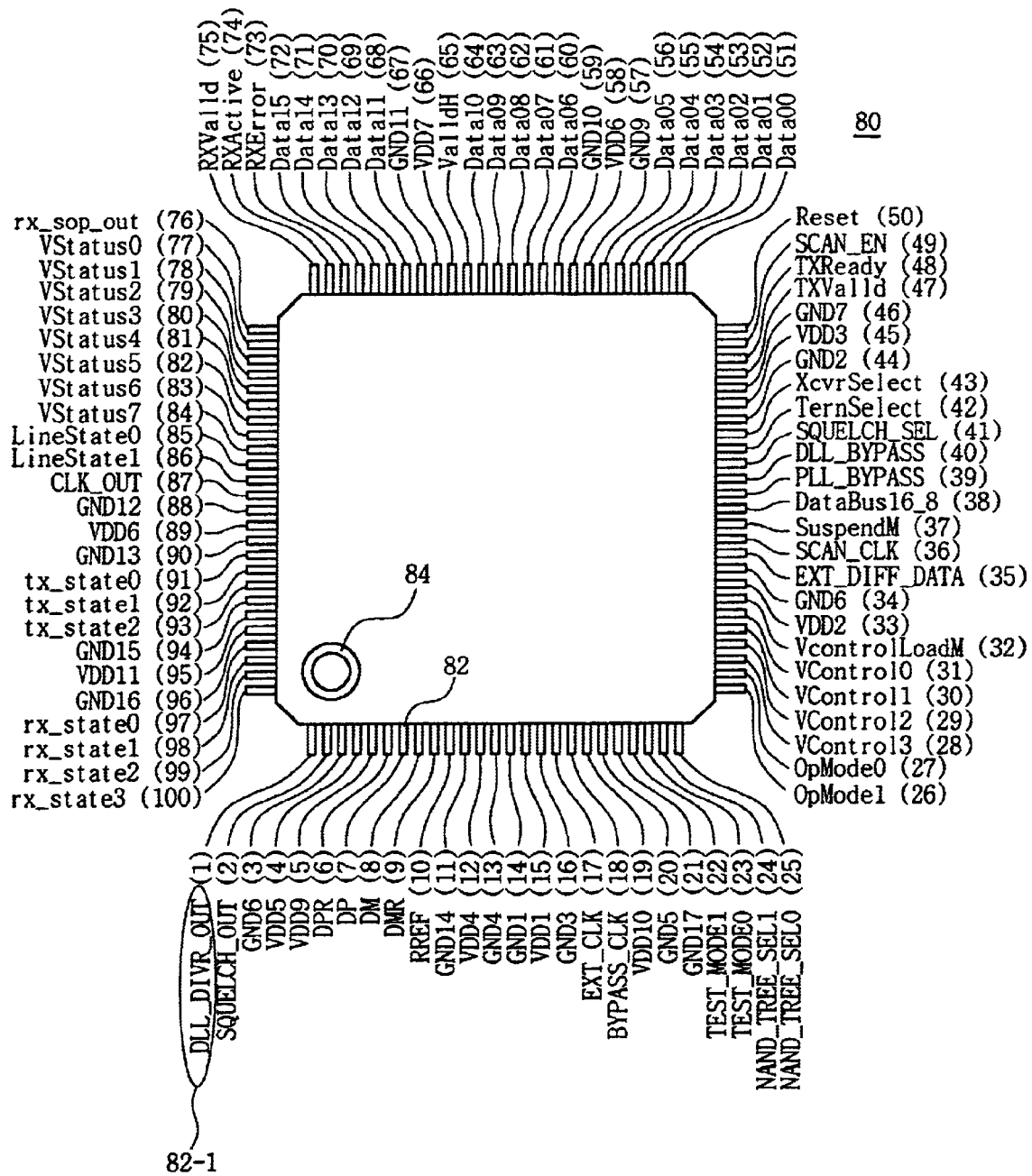
FIG. 8 is a plan view showing exemplary of a package outline.
Figure 10:
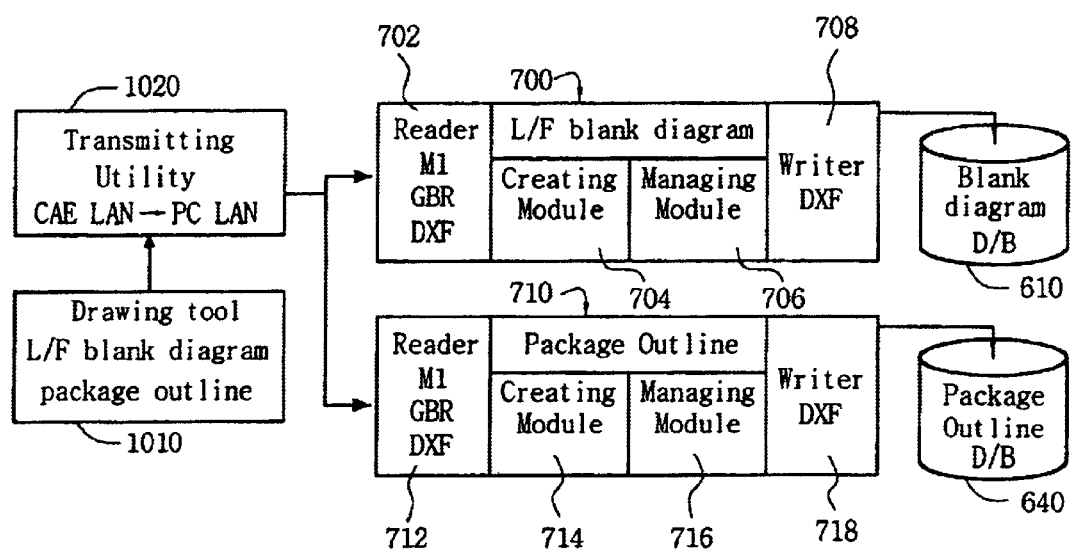
FIG. 10 is a block diagram showing modules for constructing a lead frame blank diagram database and a package outline database.

FIG. 10 is a block diagram showing modules for constructing a lead frame blank diagram database and a package outline database. Referring to FIG. 10, the lead frame blank diagram and the package outline drawn by a CAD drawing tool 1010 are transmitted, for example, from CAE LAN to PC LAN, by a transmitting utility 1020. As depicted in FIG. 6, the lead frame blank diagram displays, for example, a die pad 60, tie bars 61 and inner leads 62. As illustrated in FIG. 8, the package outline displays, for example, a contour of the package 80, pins 82 and an index mark 84. Typically, the first pin 82-1 is located in the proximity of the index mark 84. The pin number is assigned in a counter clockwise direction FIG. 8 shows TQFP (thin quad flat package) having one hundred pins.

Figure 7:
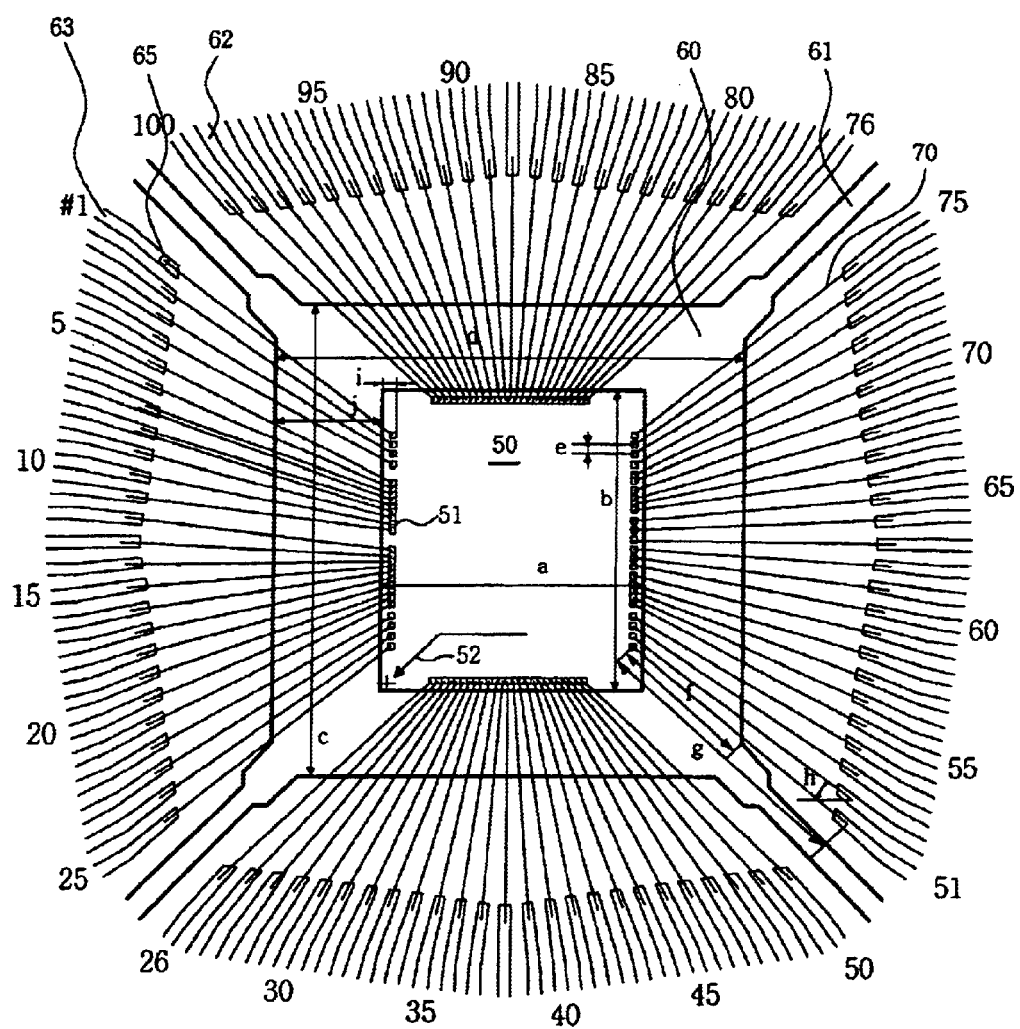
FIG. 7 is a plan view showing exemplary of a bonding diagram.

Returning to FIG. 10, the lead frame blank diagram building module 700 (also shown in FIG. 2) includes a reader 702, a creating module 704, a managing module 706 and a writer 708. The reader 702 reads CAD files with MI, GBR and DXF formats and sends them to the creating module 704. The creating module 704 receives the CAD files and converts them into the format of DXF. In other words, the MI, GBR and DXF formats are standardized into the DXF format. The managing module 706 controls data of the lead frame blank diagram. The writer 708 stores the blank diagram to the blank diagram DB 610 (also shown in FIG. 2). A blank diagram file (*.bcf) in the DMS file server (500 in FIG. 2) is one that stores data into a specific format after reading the blank diagram file with DXF format stored in the database 610. Referring to FIG. 7, such data are the dimensions ('c'x'd') of the die pad 60, the position of the first lead 63, the bonding teach point 65, the lead number, the lead frame size, etc.

Returning again to FIG. 10, the package outline building module 710 (also shown in FIG. 2) includes a reader 712, a creating module 714, a managing module 716 and a writer 718. The reader 712 reads CAD files with MI, GBR and DXF formats and sends them to the creating module 714. The creating module 714 receives the CAD files and converts them into the format of DXF. In other words, the MI, GBR and DXF formats are standardized into the DXF format. The managing module 716 controls data of the package outline. The writer 718 stores the package outline to the package outline DB 640 (also shown in FIG. 2). A package outline file (*.pkg) in the DMS file server (500 in FIG. 2) is one that stores data into a specific format after reading the package outline file with DXF format stored in the database 640. Referring to FIG. 8, such data are the package contour 80, the number of the pins 82, the location of the index mark 84, etc.

Figure 11:
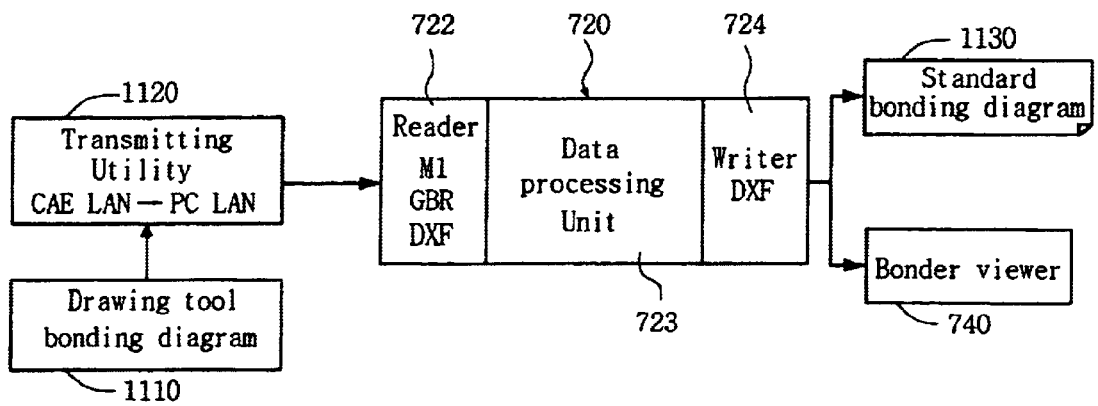
FIG. 11 is a block diagram showing a module for processing CAD data.

FIG. 11 shows the CAD data processing module 720 also shown in FIG. 2. As discussed above, this module 720 converts data drawn by the CAD drawing tools into data suitable for the actual bonding process. As shown in FIG. 11, the CAD data processing module 720 includes a reader 722, a data processing unit 723 and a writer 724. After the bonding diagram drawn by a CAD drawing tool 1110 are transmitted from CAE LAN to PC LAN by a transmitting utility 1120, the reader 722 reads files with MI, GBR and DXF formats and sends them to the data processing unit 723. The data processing unit 723 performs a centering operation for correcting center points and exact bonding points on the electrode pad of the IC chip and the lead of the lead frame, thereby producing accurate data. The data are then stored with a specific file format such as DXF by the writer 724. The writer 724 creates a standard bonding diagram 1130 and sends resultant information to the bonder viewer module 740 also shown in FIG. 2.

Figure 12:
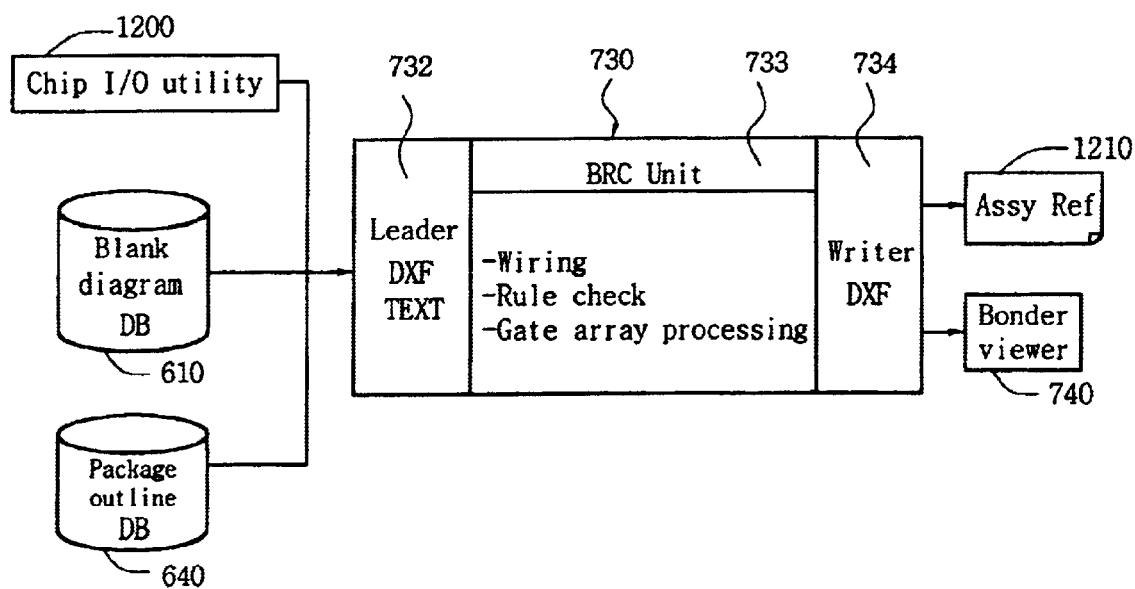
FIG. 12 is a block diagram showing a module for checking a bonding rule.

FIG. 12 shows the BRC module 740 also shown in FIG. 2. The BRC module 730 has a reader 732, a BRC unit 733 and a writer 734. The reader 732 reads a pad file produced by a chip I/O utility 1200, a blank diagram file stored in the blank diagram database 610 (also shown in FIG. 2), and a package outline database 640 (also shown in FIG. 2). The reader 732 can read DXF files or text files. The BRC unit 733 verifies whether particular IC products meet the bonding rule described above. The BRC unit 733 also performs wiring and gate array processing operations. The wiring operation provides automatic wiring function based on the pad file, editing function for a defect wiring, and altering into special wiring such as wiring between the electrode pad and the die pad. The gate array processing operation builds verified chip layout data into a chip pad file so that a user can retrieve the chip pad file whenever the user changes only the internal design without altering basic layout. Check results of the BRC unit 733 are stored with a file format such as DXF or BVF (bonder viewer file) by the writer 734, then registered as the Assy Ref 1210, and sent to the bonder viewer module 740.

Data Flow

Figure 13:
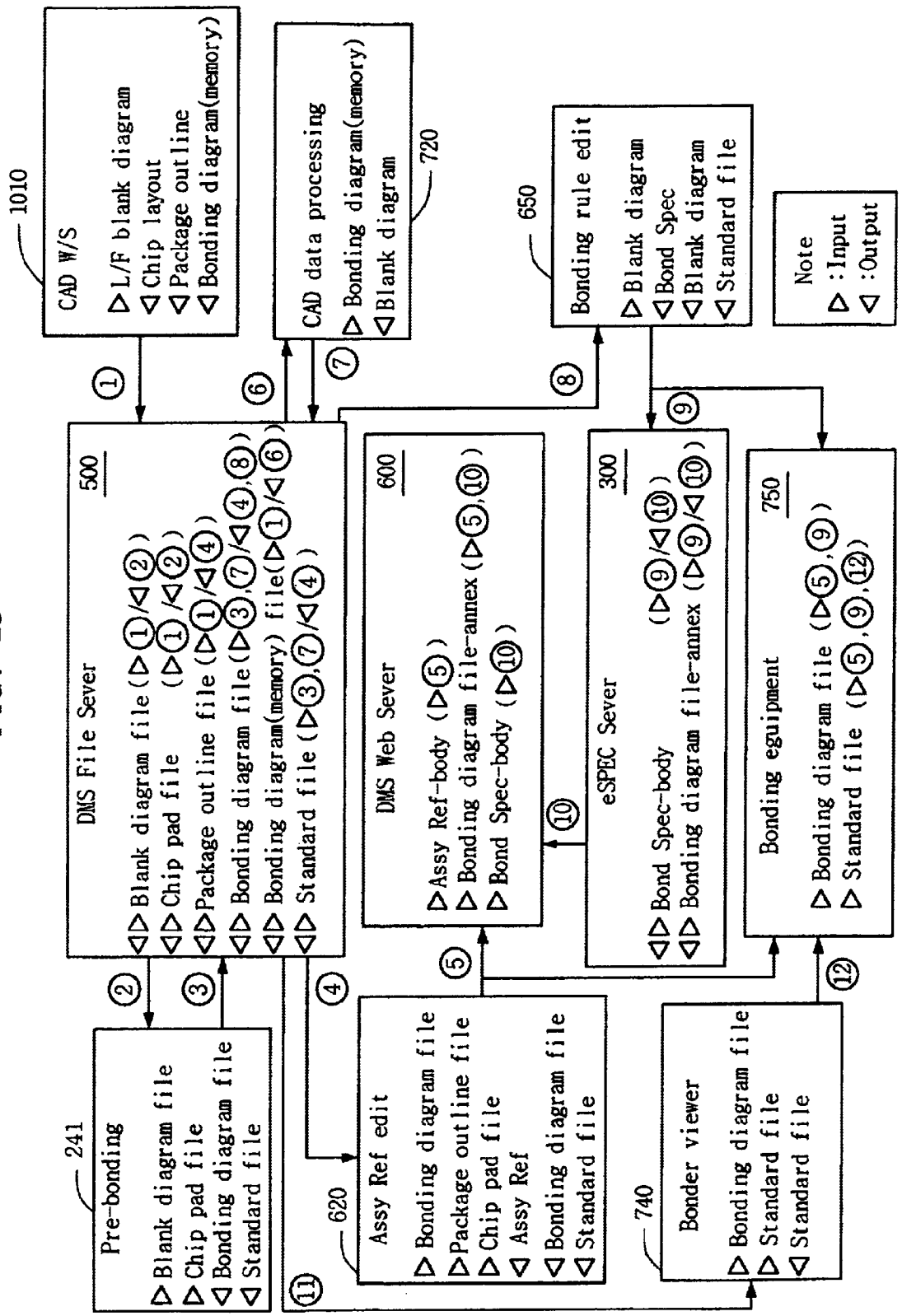
FIG. 13 is a flow diagram showing a date flow in an integrated management system in accordance with the present invention.

FIG. 13 is a flow diagram showing a date flow in the integrated management system, centering on functions performed by a combination of internal and external hardware and software of the system. In FIG. 13, reference marks '▶', '◀' represent input and output of data, respectively.

Referring to FIG. 13, at the outset, the CAD workstation platform 1010 (also shown in FIG. 10) produces the lead frame blank diagram, the chip layout, the package outline and the memory bonding diagram (in case of the memory chip), and then inputs them into the DMS file server 500 (also shown in FIG. 2). Based on input data from the CAD platform 1010, the DMS file server 500 creates the blank diagram file, the chip pad file, the package outline file and the memory bonding diagram file. The blank diagram file and the chip pad file are transmitted to the pre-bonding 241 (also shown in FIG. 1). The package outline file is sent to the Assy Ref edit 620 (also shown in FIG. 2), and the memory bonding diagram file is sent to the CAD data processing module 720 (also shown in FIG. 2). Further, the DMS file server 500 produces the bonding diagram file, based on either the bonding diagram file with DXF format drawn by the pre-bonding 241 or the memory bonding diagram file with DXF format converted by the CAD data processing module 720. Thereafter the bonding diagram file produced by the DMS file server 500 is sent to the Assy Ref edit 620 and the Bond Spec edit 650 (both also shown in FIG. 2). Further, the DMS file server 500 generates a standard file with STD format, based on output data from both the pre-bonding 241 and the CAD data processing module 720, and then sends it to the Assy Ref edit module 620.

In the pre-bonding 241, input data are the blank diagram file and the chip pad file, whereas output data are the bonding diagram file and the standard file. In the Assy Ref edit 620, input data are the bonding diagram file, the package outline file and the chip pad file, whereas output data are the Assy Ref file, the bonding diagram file and the standard file. The standard file is available for the bonding equipments 750 (also shown in FIG. 2), including location data on start and end points of the wires, wire bonding sequence data, wire bonding direction data, datum points establishing data, parameter grouping data, drawing rotation data, data on the origin, data on the number and position of the chips, and the others.

The DMS web server 600 (also shown in FIG. 2) uses the Assy Ref file and the bonding diagram file, produced by the Assy Ref edit 620, as input data The DMS web server 600 enters the Assy Ref file and the bonding diagram file into a body and an annex of the Assy Ref document, respectively. The DMS web server 600 also enters the Bond Spec outputted from the eSPEC server 300 (also shown in FIG. 1) into the body of the Assy Ref document, and provides web services of the Assy Ref document to remote users.

The Bond Spec edit 650 uses the bonding diagram as input data, and then outputs the Bond Spec, the bonding diagram and the standard file. This output is transmitted to the eSPEC server 300 and the bonding equipment 750. The ESPEC server 300 receives the Bond Spec from the Bond Spec edit 650 and sends it to the DMS web server 600. The bonding equipment 750 executes the automated wire bonding process, employing the bonding diagram files and the standard files as input data. The bonding diagram files used in the equipment 750 are output from both the Assy Ref edit 620 and the Bond Spec edit 650. In addition, the standard files used are output from the bonder viewer 740, as well as the Assy Ref edit 620 and the Bond Spec edit 650. The bonder viewer 740 (also shown in FIG. 2) receives the bonding file and the bonder viewer file from the DMS file server 500 and then supplies the standard file to the bonding equipment 750.

Assembly Reference Review/Edit Procedure

Figure 14:
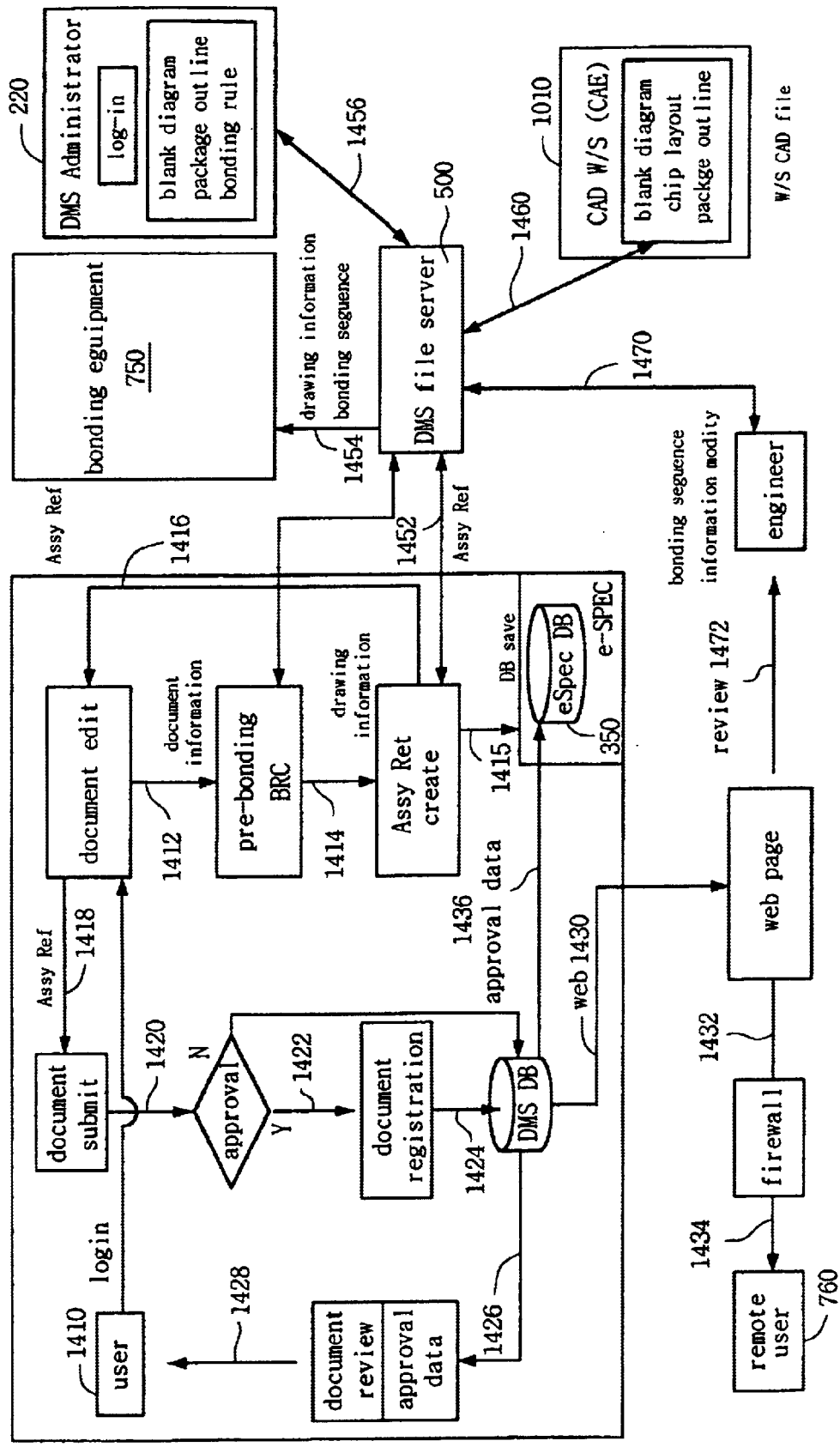
FIG. 14 is a flow diagram showing review and edit procedure of Assembly Reference in an integrated management system in accordance with the present invention.

FIG. 14 illustrates review and edit procedure of the Assy Ref. As depicted in FIG. 14, a user, such as a designer or assembly process engineer, logs in the system of the present invention (step 1410). The user selects the document edit, e.g., the Assy Ref edit 244 in FIG. 1, and enters requisite document information such as package types or chip types by directly inputting or choosing one in a list provided by the system (step 1412). Drawing information completed through the pre-bonding and the BRC is transmitted to the Assy Ref creation (step 1414) and stored in a database 350 of the eSPEC (300 in FIG. 1). The probonding and the BRC utilize drawing information supplied by the DMS file server 500, and the results of the pre-bonding and the BRC are sent to the DMS file server 500. An interchange of data is also made between the Assy Ref creation and the DMS file server 500.

After the Assy Ref is created, the document as the Assy Ref is returned to the document edit (step 1416) and submitted for approval (steps 1418, 1420). If approved, the document is registered (step 1422) and stored in the DMS database 410 (step 1424). If not approved, the document is revised and stored in the DMS database 410 (step 1490). The user can review or search the documents stored in the DMS server 410, together with approval information (steps 1426, 1428). The documents in the DMS server 410 is supplied through web services (step 1430). The remote user 760 can access information about registration or revision of the documents in the DMS server 410 through firewall (steps 1432, 1434).

Further, the web services permit the access of engineers such as assembly process engineers and designers. The, engineers can review the documents stored in the DMS database 410 through the web services 1430 (step 1472), and modify document information such as bonding sequence through the DMS file server 500 (step 1470).

The CAD workstation platform 1010 (also shown in FIG. 13) produces CAD files of the blank diagram, the chip layout and the package outline, and sends them to the DMS file server 500 (step 1460). The DMS file server 500 provides the DMS administrator 220 (also shown in FIG. 1) with functions of managing the blank diagram, the package outline and the bonding rule (step 1456). The bonding equipment 750 receives the drawing information and the bonding sequence from the DMS file server 500 (step 1454) and performs the automated wire bonding process.

Bonding Specification Review/Edit Procedure

Figure 15:
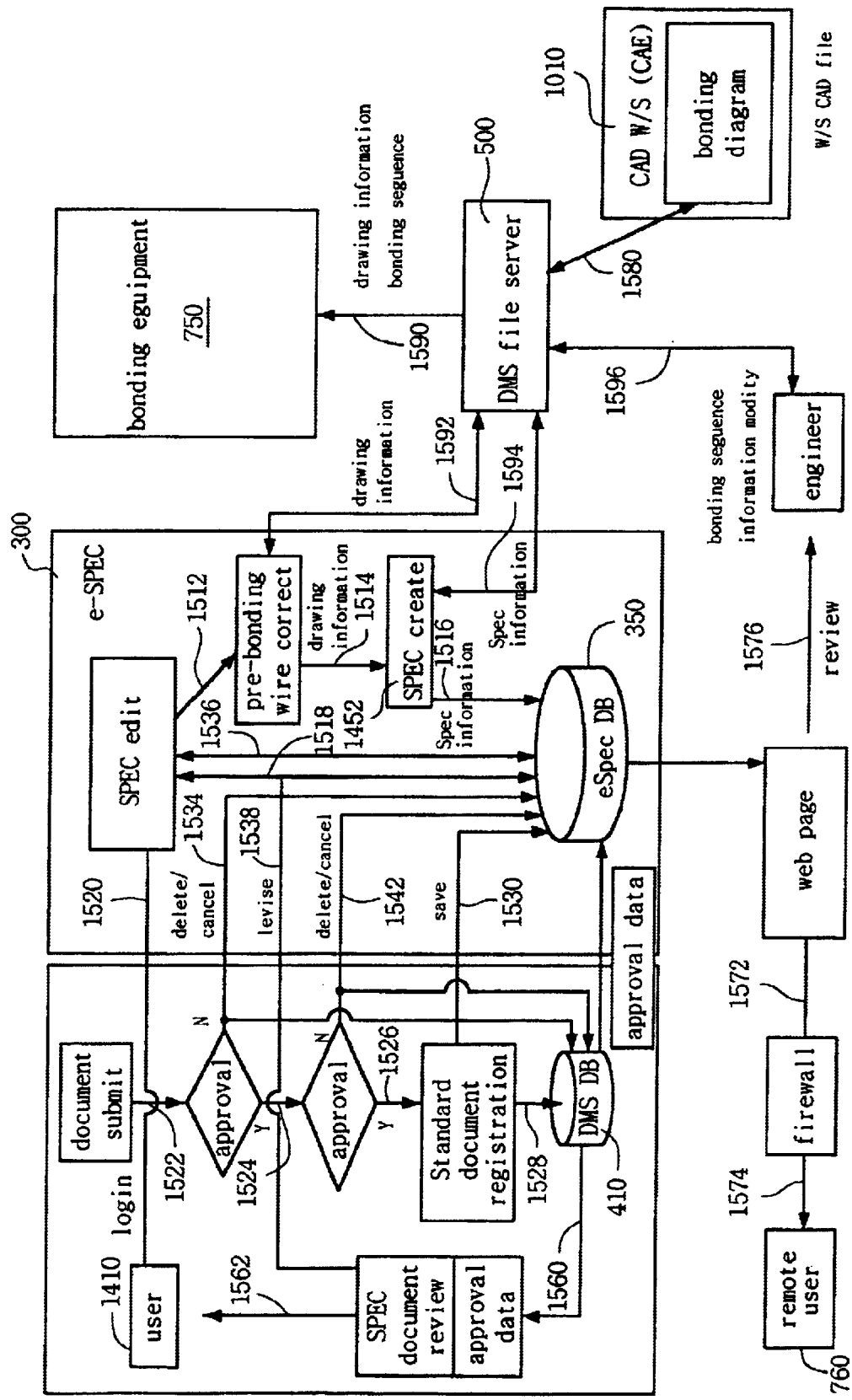
FIG. 15 is a flow diagram showing review and edit procedure of Bonding Specification in an integrated management system in accordance with the present invention.

FIG. 15 illustrates review and edit procedure of Bond Spec. Referring to FIG. 15, a user logs in the system of the present invention (step 1410). When the user selects the Bond Spec edit (340 in FIG. 1), pre-bonding function and wire correcting function are displayed (step 1512). Based on drawing information supplied from the DMS file server 500

(step 1592), the user performs pre-bonding operation and wire correcting operation (step 1514). Therefore, the Bond Spec is created and stored in the eSPEC database 350 (step 1516). The Bond Spec is returned to the Bond Spec edit (step 1536) and submitted for approval (steps 1520, 1522). If approved, the document is given to a final conference (step 1524). Passing the final conference, the Bond Spec is registered as standard document (1526) and stored in the DMS database 410 (step 1528). The final conference means a working-level meeting of technical post and quality control post. The final conference step may be combined with the approval step. If rejected in the approval step or the conference step, details about the rejection are stored in the DMS database 410 (steps 1532, 1540) and the document is revised (steps 1534, 1542). The revised document is stored in the eSPEC database 350 and again submitted for approval.

The user can review or search the Bond Spec stored in the DMS server 410, together with or without approval data (steps 1560, 1562). The approval data in the DMS database 410 is transmitted to the ESPEC database 350 (step 1564). Though generated at the DMS level the approval data including significant information such as drawing data or chip pad file had better be stored in the eSPEC database 350 to assist easier submission for approval.

The Bond Spec documents stored in the CSPEC database 350 are provided to the remote user 760 through web interface (step 1570). For example, when a new Bond Spec document is registered or an existing Bond Spec document is revised, the remote user 760 receives a notification and reads related information through firewall (steps 1572, 1574). Field engineers such as assembly process engineers can review the Bond Spec document through the web interface (step 1576) and, if there is a need to change information such as: bonding sequence, can modify the Bond Spec document through the DMS file server 500 (step 1596). The DMS file server 500 receives the bonding diagram from the CAD platform 1010 (step 1580) and sends the drawing information, such as the Bond Spec, and information on the bonding sequence to the bonding equipment 750 (step 1590).

In the drawings and specification, there has been disclosed a preferred embodiment of the invention and, although specific terms are employed, they are used in a generic and descriptive sense only and not for purposes of limitation, the scope of the invention being set forth in the following claims.

What is claimed is:

1. An integrated management system structured to automatically execute a procedure of reviewing and editing an assembly reference and a bonding specification used for manufacturing IC packages, said system comprising:

a drawing management system structured to output the assembly reference including a bonding diagram, a package outline, a package pin configuration, and package pin coordinates;

a bonding specification drawing system structured to output, based on the assembly reference, the bonding specification including a chip size of a chip, an electrode pad size for each electrode pad on the chip, an electrode pad position of the each electrode pad, a die pad size of each die pad, a die pad position of the each die pad, a length of each bonding wire, a position and an angle of the each bonding wire, a bonding sequence, a datum point for the each electrode pad, a datum point of each lead, a central point for the electrode pad, and a bonding attach point of the lead;

a database server structured to store and manage the assembly reference and the bonding specification;

a file server structured to manage an information diagram for a standard component, the package outline, the bonding diagram, and a formatted output file; and a web server structured to provide a web interface to a user seeking to establish a remote access with the drawing management system, wherein the drawing management system comprises a bonding rule check module structured to verify whether the bonding specification meets a bonding rule suitable for an automated wire bonding process, and wherein the drawing management system is structured to transmit the formatted output file to a bonding apparatus.

2. The system of claim 1, wherein the drawing management system is structured to provide an assembly reference review and an assembly reference edit.

3. The system of claim 1, wherein the drawing management system is structured to provide a pre-bonding module based on the bonding diagram that simulates the wire bonding process.

4. The system of claim 3, wherein the pre-bonding module is structured to output a list according to the electrode pad size the chip size, and a package type.

5. The system of claim 1, wherein the drawing management system is structured to provide a batch modification module that applies a partial modification of the assembly reference or the bonding specification to an entire database.

6. The system of claim 1, wherein the drawing management system is structured to provide an administrator menu module.

7. The system of claim 1, wherein the drawing management system is structured to provide an information menu module.

8. The system of claim 1, wherein the database server is structured to store bonding rule data.

9. The system of claim 1, wherein the file server is structured to output a chip pad file obtained from the bonding specification and is structured to transmit the chip pad file.

10. The system of claim 9, wherein the chip pad file includes a dimensions of the chip, a size of an opening on the electrode pad, an arrangement and a total number of electrode pads, a pitch between two electrode pads, and a width and a length of a scribe line.

11. The system of claim 10, wherein the chip pad file further includes a position of a chip ID mark, a location of the connection between the electrode pad and the lead, BGA ball numbers, and physical data on the electrode pad.

12. The system of claim 1, wherein the web server provides a blank diagram database, a package outline database, and a bonder viewer.

13. The system of claim 12, wherein the bonder viewer displays the bonding diagram retrieved through the filer server according to a bonding procedure.

14. The system of claim 1 further comprising a CAD data processing module.

15. The system of claim 14, wherein the CAD data processing module is structured to perform a centering operation that determines a central point of the lead and the electrode pad from the bonding diagram, and is structured to transmit data necessary for a bonder viewer.

16. The system of claim 14, wherein the IC packages includes memory semiconductor devices.

17. The system of claim 14, wherein the CAD data processing module includes a reader structured to read an original bonding diagram drawn by a CAD drawing tool, a data processing unit structured to perform a centering operation, and a writer structured to store the bonding diagram file to a corresponding database.

18. The system of claim 17, wherein the CAD data processing module is structured to output a standard bonding diagram to a bonder viewer module.

19. The system of claim 1, wherein the bonding rule check module has bonding rules based on a pitch between two electrode pads.

20. The system of claim 19, wherein the bonding rules includes rules related to a bonding pad opening, an electrode pad layout, a chip pad design, a bonding wire, and a chip dimension.

21. The system of claim 20, wherein the rules related to the bonding pad opening prescribe a size of the bonding pad opening and an intervals associated with the bonding pad opening, wherein the rules related to the electrode pad layout prescribe a minimum corner pad pitch, the number of corner pads, and a minimum space between corner bonding pad openings, wherein the rules related to the chip pad design prescribe spaces between the electrode pads, peripheral circuitry, and the scribe line, wherein the rules related to the bonding wire define a dimension and an angle of the wire, and wherein the rules related to the chip dimension define a chip pitch.

22. The system of claim 1 further comprising a blank diagram building module that includes a reader structured to read an original blank diagram drawn by a CAD drawing tool, a creating module structured to convert the original blank diagram into a blank diagram file, and a writer structured to store the blank diagram file to a corresponding database.

23. The system of claim 22, wherein the blank diagram file includes the die pad size and a position of the lead.

24. The system of claim 23, wherein the blank diagram includes the die pad position, information on the lead, the datum point of the lead for a wire bonder, and the bonding attach points of the leads.

25. The system of claim 1 further comprising a package outline building module that includes a reader structured to read an original package outline drawn by a CAD drawing tool, a creating module structured to convert the original package outline into a package outline file, and a writer structured to store the package outline file to a corresponding database.

26. The system of claim 25, wherein the package outline file includes a package contour, the number of package pins, and a location of an index mark.

27. The system of claim 1, wherein the bonding rule check module includes a reader, a bonding rule check unit, and a writer.

28. The system of claim 27, wherein the bonding rule check module provides automatic wiring operation based on a chip pad file.

29. The system of claim 27, wherein the bonding rule check module is structured to provide a gate array processing operation that builds verified chip layout data into a chip pad file in response to the user's request.

30. The system of claim 1, wherein the blank diagram includes a lead frame blank diagram and a printed circuit board blank diagram.

31. A method of automatically executing a procedure of reviewing and editing an assembly reference and a bonding specification based on the assembly reference, wherein the assembly reference and the bonding specification are used for manufacturing IC packages, said method comprising:

producing the assembly reference with a drawing management system, the assembly reference comprising a bonding diagram, a package outline, a package pin configuration, and package pin coordinates, wherein producing the assembly reference further comprises verifying whether the bonding specification meets a bonding rule suitable for an automated wire bonding process using a bonding rule check module;

producing the bonding specification with a bonding specification drawing system, the bonding specification comprising a chip size of a chip, an electrode pad size for at least two electrode pads on the chip, an electrode pad position of the at least two electrode pads, a die pad size of a die pad of the chip, a die pad position of each die pad, a length of each bonding wire, a position and an angle of each bonding wire, a bonding sequence, a datum point for each of the at least two electrode pads, a datum point of a lead, a central point for each of the at least two electrode pads, and a bonding attach point of the lead;

storing and managing the assembly reference and the bonding specification with a database server;

managing an information diagram for a standard component, the package outline, the bonding diagram, and a formatted output file with a file server;

establishing a connection between the drawing management system and a remote user with a web browser interface; and transmitting the formatted output file to a bonding apparatus.

* * * * *

UNITED STATES PATENT AND TRADEMARK OFFICE
CERTIFICATE OF CORRECTION

PATENT NO.    : 6,851,100 B1
DATED         : February 1, 2005
INVENTOR(S)   : You et al.

It is certified that error appears in the above-identified patent and that said Letters Patent is hereby corrected as shown below:

Title page,
Item [56], References Cited, U.S. PATENT DOCUMENTS,
"5,608,638", replace "3/1997" with -- 5/1997 --.

Column 1,
Line 36, replace "typically; includes" with -- typically includes --.
Line 27, replace "silver-poxy" with -- silver epoxy --.
Line 39, replace "base and a" with -- base, and a --.

Column 2,
Line 56, replace "fingers are, identified" with -- fingers are identified --.

Column 4,
Line 66, replace "filly convey" with -- fully convey --.

Column 5,
Line 32, replace "Assy Pef is" with -- Assy Ref is --.
Line 50, replace "data- point of" with -- data point of --.
Line 57, replace "an Assy; Ref review" with -- an Assy Ref review --.

Column 6,
Line 54, replace "BRC bonding rule" with -- BRC (bonding rule --.

Column 7,
Line 28, replace "The ODS file" with -- The GDS file --.

Column 8,
Line 14, replace "one - tone" with -- one-to-one --.
Line 43, replace "associated; with" with -- associated with --.

Column 10,
Line 84, replace "direction Fig 8 shows" with -- direction. Fig 8 shows --.

Column 11,
Line 57, replace "input data The DMS" with -- input data. The DMS --.

Column 12,
Line 25, replace "The probonding and" with -- The pre-bonding and --.

Column 12 (cont'd),

UNITED STATES PATENT AND TRADEMARK OFFICE
CERTIFICATE OF CORRECTION

PATENT NO.   : 6,851,100 B1
DATED        : February 1, 2005
INVENTOR(S)  : You et al.

It is certified that error appears in the above-identified patent and that said Letters Patent is hereby corrected as shown below:

Line 25, replace "The, engineers" with -- The engineers --.

Column 13,
Line 34, replace "such as: bonding" with -- such as bonding --.

Column 14,
Line 25, replace "the CSPEC" with -- the eSPEC --.
Line 41, replace "dimensions" with -- dimension --.
Line 53, replace "the filer server" with -- the file server --.
Line 63, replace "includes" with -- include --.

Column 15,
Line 10, replace "includes" with -- include --.
Line 15, replace "intervals" with -- interval --.
Line 37, replace "points" with -- point --.

Signed and Sealed this

Fourteenth Day of March, 2006

JON W. DUDAS
*Director of the United States Patent and Trademark Office*